April 9, 1940.  W. G. VAN VOORHIS ET AL  2,196,880
BALLAST CLEANING MACHINE
Filed Jan. 3, 1938    6 Sheets-Sheet 4
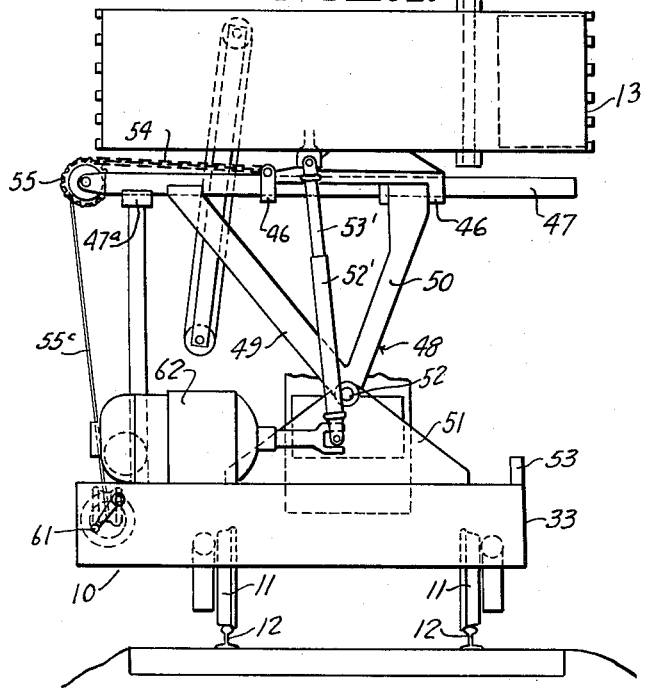
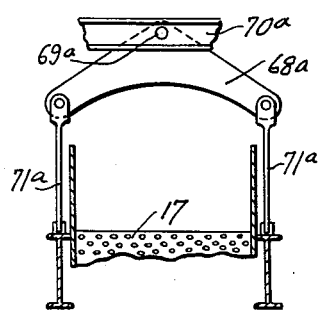
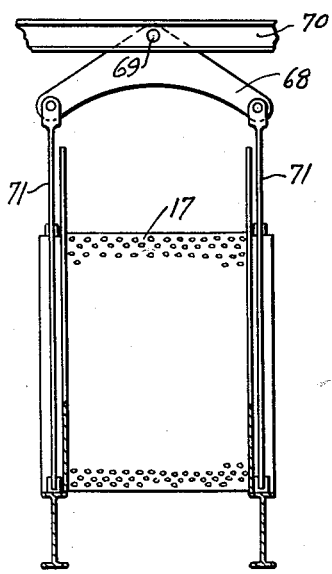
INVENTORS
William G. Van Voorhis &
Charles A. Crabiel
BY
ATTORNEY

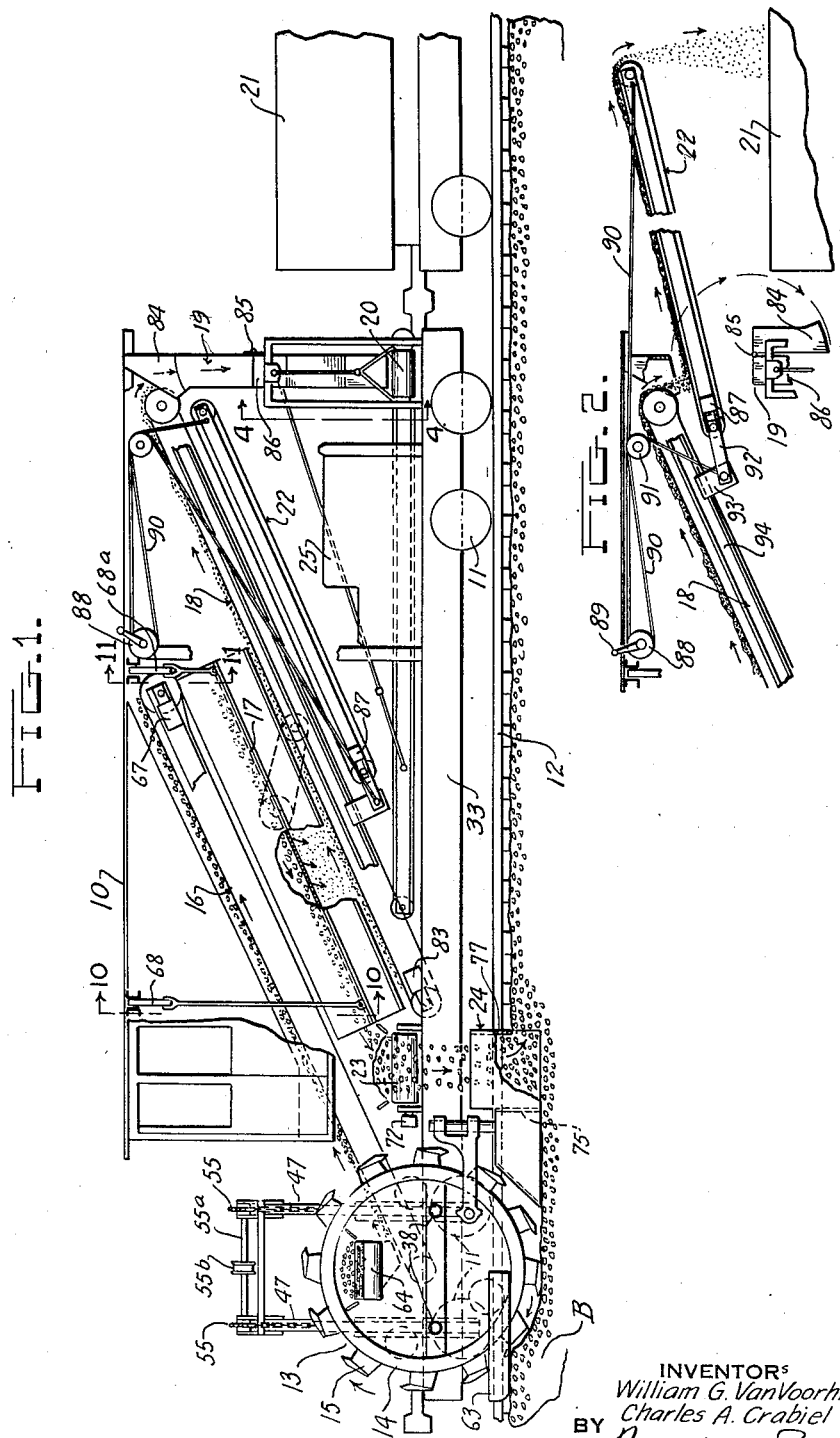

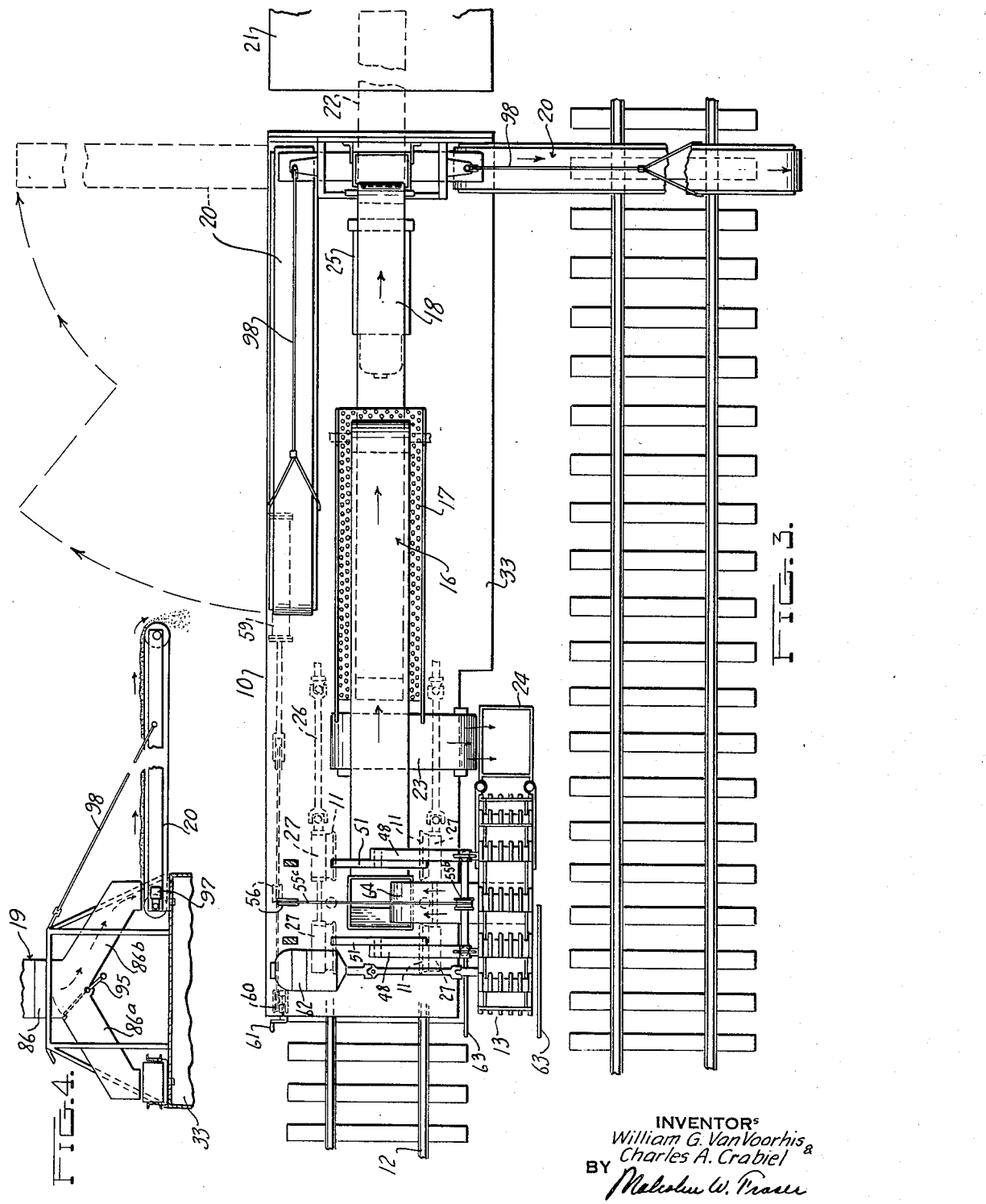

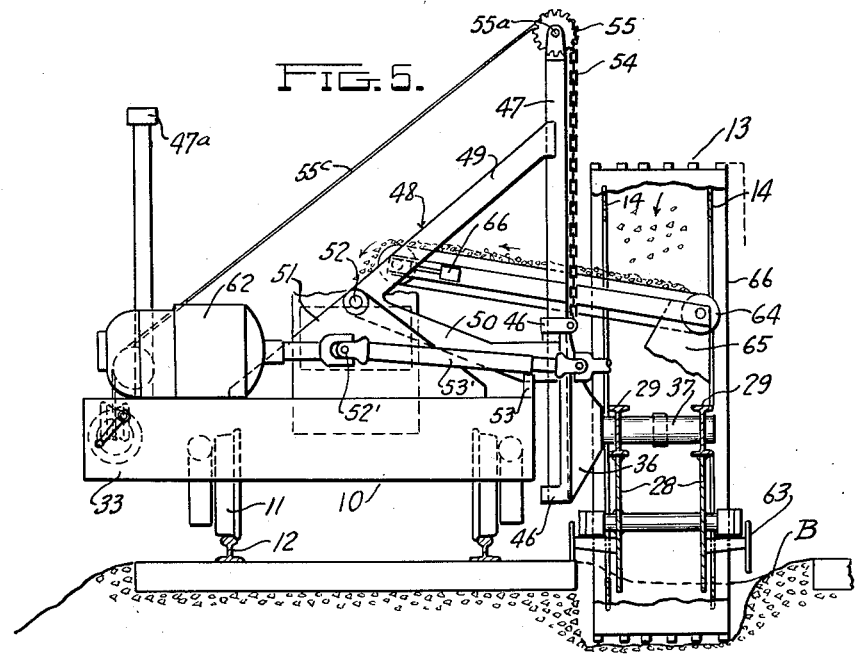
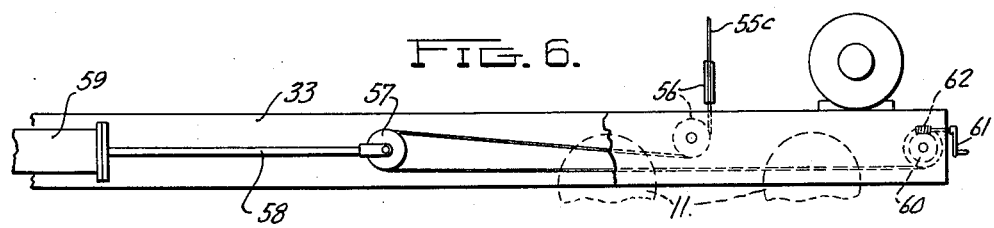
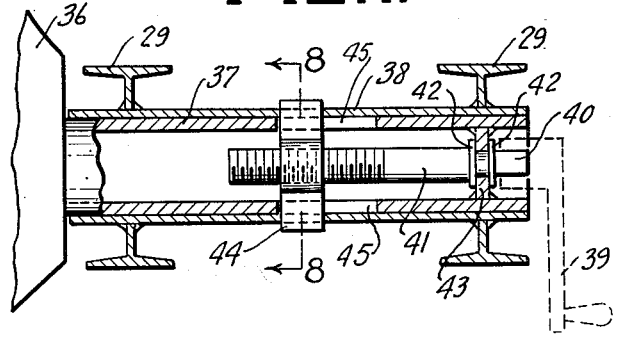
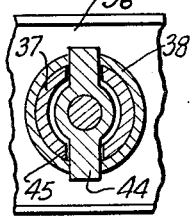

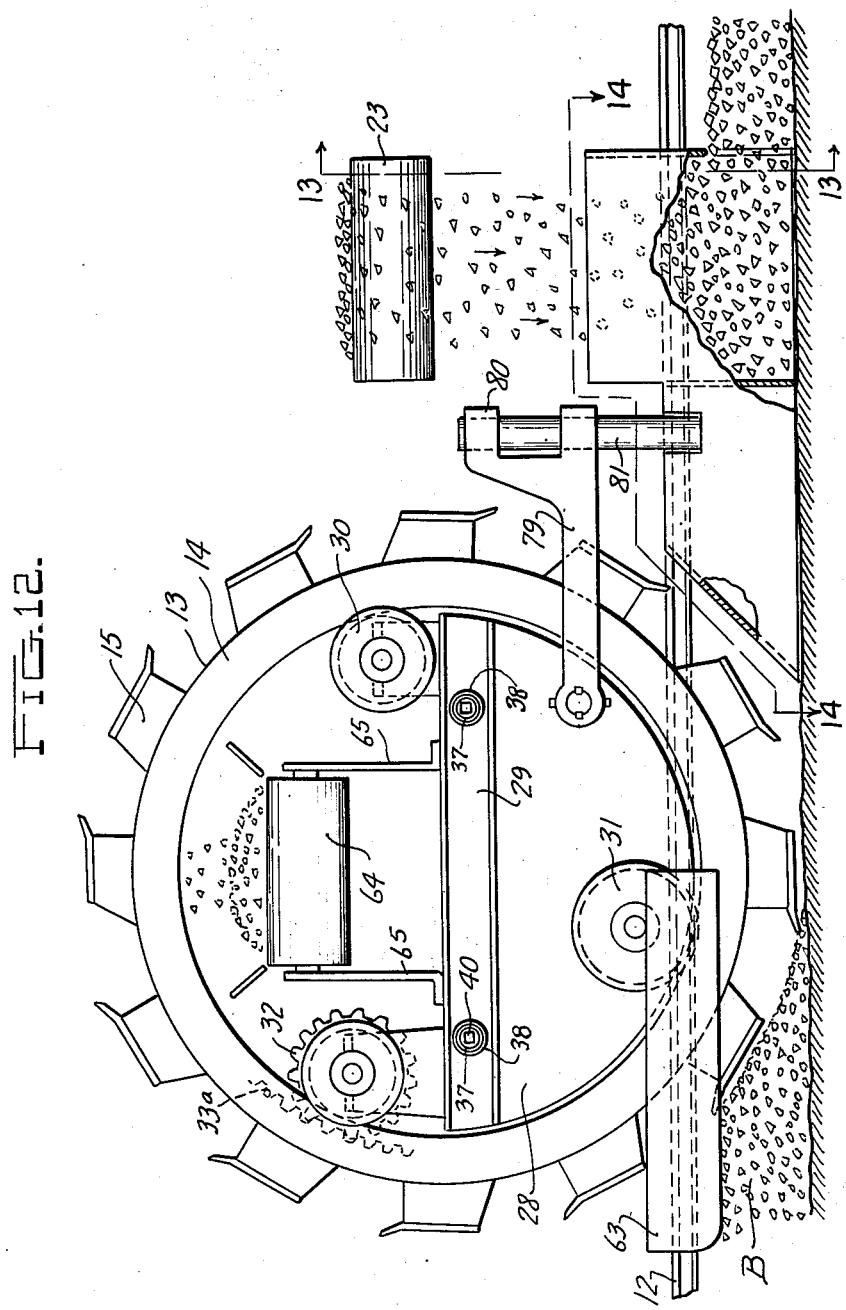

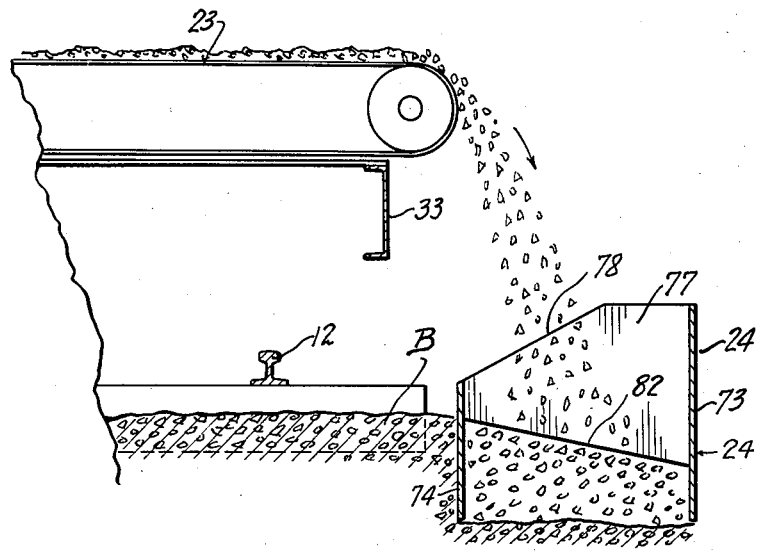
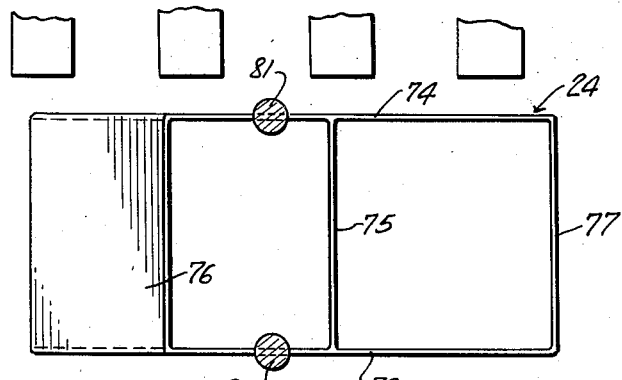
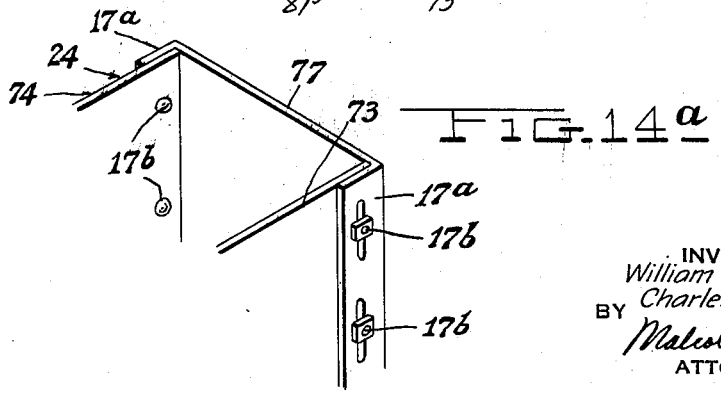

Patented Apr. 9, 1940

2,196,880

UNITED STATES PATENT OFFICE 2,196,880

BALLAST CLEANING MACHINE

William G. Van Voorhis, Findlay, and Charles A. Crabiel, North Baltimore, Ohio, assignors to The Buckeye Traction Ditcher Company, Findlay, Ohio, a corporation of Ohio Application January 3, 1938, Serial No. 183,147

6 Claims. (Cl. 262—2)

This invention relates to ballast cleaning machines of the type employed in removing the ballast of a railway track, cleaning it and returning it and at the same time suitably disposing of the spoil or dirt.

It is a desideratum to produce a ballast cleaning machine having translatory movement under its own power along the rails and which is capable, during such advancing movement, to remove the ballast, clean it and return the cleaned stone to a position directly in rear of the digging tool, the operation of the digging tool being timed with the forward movement of the machine. Most machines of this type are not designed to operate purely under their own power nor are they capable of expediting the cleaning of the ballast in an efficient manner to enable a sizable stretch of track to be cleaned within a reasonably short period of time. Many machines of this character require the service of a locomotive to pull them over the tracks during the cleaning operation or their advancing movement is effected by cables and winches employed for this purpose. As a consequence, most machines of this type have been unusually clumsy and cumbersome and have failed completely to clean the ballast on an efficient and economical basis.

Objects of this invention are to overcome the above difficulties and to produce a railway ballast cleaning machine which is sturdy and reliable in construction, relatively simple in design and efficient and economical in operation; to produce a ballast cleaner employing a centerless digging wheel arranged at one side of a railway car for digging the ballast, thereafter cleaning the same and returning the cleaned stone to the original cut during the advancing or translatory movement of the car; to mount the digging wheel for lateral adjustment relative to the railway car thereby to adjust same toward or away from the adjacent ends of the railway ties; to mount the digging wheel for vertical adjustment relative to an upright on the railway car and enable the upright and wheel to be swung upon a horizontal axis when not in use to a position above the railway car; to produce a support for the centerless digging wheel which is arranged within the lateral dimensions thereof whereby the frame does not project outwardly beyond the outer side of the wheel; to control the return of the cleaned ballast or stone to the bed and govern the profile of the bed formed by the cleaned ballast; to produce a shoe or profile former to which the cleaned stone is returned, the shoe riding in the cut formed by the digging wheel and being mounted to float vertically to enable it to accommodate itself to the terrain and dig itself in in the desired manner; to produce means for preventing the digging wheel from throwing the stone laterally and to confine the stone thrown up ahead of the cut to the limit of the digging wheel width; to produce a conveyor arrangement for the ballast dug up by the digging wheel and the spoil or tailings which is adjustable to deliver the spoil to one or both sides of the machine or to a point in rear of the machine, as desired; to mount the vibrating screen to which the ballast is delivered for cleaning in such manner that it automatically maintains itself in substantially horizontal position regardless of the angularity assumed by the railway car and other parts; and to produce a ballast cleaning machine having the new and improved features of construction, arrangement and operation hereinafter described.

For purposes of illustration but not of limitation, an embodiment of the invention is shown on the accompanying drawings, in which—

Figure 1 is a side elevation of a ballast cleaning machine;

Figure 2 is an enlarged detailed view showing one of the conveyors extended for carrying spoil or dirt to a point in rear of the machine;

Figure 3 is a top plan view of the machine shown in Figure 1;

Figure 4 is a vertical sectional elevation substantially on the line 4—4 of Figure 1;

Figure 5 is a front end elevation of the machine;

Figure 6 is a fragmentary detailed view showing the cable operating mechanism for bodily moving the digging wheel away from digging position;

Figure 7 is an enlarged longitudinal sectional elevation of the support for the digging wheel frame showing the mechanism for adjusting the same laterally;

Figure 8 is a transverse sectional view on the line 8—8 of Figure 7;

Figure 9 is a front end elevation of the machine showing the digging wheel moved to travelling position after having been bodily moved to a point above the railway car;

Figure 10 is an enlarged sectional elevation substantially on the line 10—10 of Figure 1;

Figure 11 is a sectional elevation substantially on the line 11—11 of Figure 1;

Figure 12 is an enlarged side elevation of the digging wheel and associated parts showing particularly the manner in which the cleaned ballast is delivered to the shoe or profile former;

Figure 13 is a fragmentary sectional elevation substantially on the line 13—13 of Figure 12;

Figure 14 is a sectional view substantially on the line 14—14 of Figure 12 showing the upper end of the shoe or profile former.

Figure 14a is a detail fragmentary perspective view showing the adjustable rear wall of the shoe.

Referring to the drawings, the car body as a whole is designated by the numeral 10 and is mounted on flanged wheels 11 to travel upon track rails 12. Mounted at the forward end of the car body and at one side thereof is a centerless digging wheel 13 formed with rims 14 on which is an annular series of buckets 15 formed with teeth to dig into the ballast B and deliver same through a cross conveyor 64 to a vertically inclined conveyor 16 which discharges to a vibrating screen 17 which is disposed in substantially parallel relation to the conveyor 16 subjacent thereto. The tailings, dirt or spoil pass through the screen 17 onto a vertically inclined conveyor 18 which elevates same and discharges it into a chute 19 from whence it passes to one or both of the laterally disposed conveyors 20 (Figure 3) to deposit the spoil in a suitable place. Instead of depositing the spoil laterally of the machine, it may be discharged in rear thereof onto a larry 21 suitably coupled to the machine. This is accomplished by a conveyor 22 normally disposed beneath the conveyor 18 but extensible to the dotted line position as shown in Figure 3. The cleaned stone or ballast from the screen 17 passes downwardly to a lateral conveyor 23 which is disposed directly in rear of the digging wheel 13 and delivers the stone to a shoe or profile former 24 which rides along the ground in the cut formed by the digging wheel thereby returning the cleaned ballast directly in rear of the digging wheel as the machine advances over the rails. As will hereinafter appear, the entire machine is a self-contained unit, generating its own power not only to operate the digging wheel 13 and the other parts above mentioned, but also to impart advancing or translatory movement to the machine through the flanged wheels 11.

Mounted on the railway car is a power unit 25 such as a Diesel electric or gasoline electric unit for generating current for operating separately controlled motors to drive the various parts as will hereinafter appear. If desired, the various parts may be driven by direct transmission of power through mechanical devices from a central power unit. The unit 25 operates a motor (not shown) which is suitably connected through shafts, universal joints, etc., to drive worms 27 meshing with worm wheels individual to each of the flanged wheels 11 thereby to drive the machine along the rails 12. Further showing and description of the drive means is not considered necessary since details thereof form no part of the present invention.

The digging wheel 13 is supported by a frame consisting of a pair of laterally spaced sector shaped plates 28 arranged on the inside of the rim members 14 of the digging wheel. Secured as by welding to the upper end of each plate 28 is an I-beam 29, the ends of which are disposed within the inside diameter of the rims 14. Suitably supported on the beams 29 and plates 28 are flanged rollers 30 and 31 which engage the inside of the rim members 14 and for driving the digging wheel are gears 32 meshing with internal gears 33a on the rim members. The gears 32 and wheels 30 and 31 are arranged in equi-distant relation for supporting the digging wheel. The wheel frame is supported on the bed 33 of the railway car by a bracket 36 in the form of a casting from which projects a pair of tubular posts 37 telescoping inside of tubes 38 which extend through openings formed in the I-beams 29 to which they are fixed as by welding.

Lateral adjustment of the digging wheel 13 toward and away from the railway car may be effected so that the wheel can be properly positioned relative to the outer end of the adjacent railway ties by means of a crank handle 39 applied to the squared end 40 of a shaft 41 which is held against longitudinal movement by collars 42 disposed on opposite sides of a disk 43 secured inside of the post 37. The inner end portion of the rod 41 is screw-threaded and in engagement therewith is an adjustment nut 44 having diametrically opposed extensions fitting into openings in the outer sleeve 38 and passing through longitudinally elongate slots 45 in the inner sleeve member 37. It will be understood that by turning the crank handles 39 (the above construction being duplicated, as will be apparent), the outer sleeves or tubes 38 can be moved inwardly or outwardly relative to the bracket 36 a distance defined by the length of the slots 45.

Integral with the upper and lower ends of the bracket 36 are lugs 46 which are apertured to receive a post or upright 47 which is disposed at one side of the car bed 33, the lower end thereof, as well as the lower end of the upright 47, being disposed below the bed 33 when the digging wheel is in position of use. Fixed to the upright 47 is a substantially V-shaped frame 48 the upper leg 49 of which is fixed to the upper portion of the upright 47 and the leg 50 of which is fixed to a lower portion of the upright 47 intermediate the lugs 46 of the bracket 36. The apex of the V frame 48 is pivotally secured to a mounting 51 at 52 for swinging movements about a substantially horizontal axis. From the above description, it will be apparent that the digging wheel 13 has limited vertical movements along the upright 47 over which the lugs 46 of the bracket 36 are adapted to ride. Although description has been given of but one bracket 36 and post 47, together with the respective associated parts, it is to be understood that these parts are duplicated particularly as indicated in Figure 1, being disposed in spaced relation for supporting the digging wheel at two locations, but those skilled in the art will readily understand the construction from the description above given.

As will hereinafter appear, when the brackets 36 have been elevated a sufficient distance so that the lower lugs 46 engage the arms 50, further movement tending to raise the digging wheel will cause the digging wheel, the uprights 47 and the V frames 48 to swing bodily about the axis 52 to position these parts substantially as shown in Figure 9 with the uprights 47 resting upon saddles 47a and in which position the digging wheel is disposed in inoperative position suitable for travelling. When the digging wheel is in position of use, the outer end portions of the arms 50 of the frames 48 rest in saddles 53 mounted on the car bed 33.

Raising of the wheel 13 is accomplished by chains 54 secured at their lower ends to the upper end of the brackets 36 and at their opposite ends to sprocket wheels 55 on the upper ends of the uprights 47. The sprocket wheels 55 are fixed to a shaft 55a to which is fixed a drum 55b. A cable 55c leads from the drum 55b about sheaves 56 and over a sheave 57 connected to a piston rod 58 leading from an air cylinder 59. The opposite end of the cable 55c is anchored to a sheave or winch 60 which can be manually operated by a crank 61 through the worm and wheel connection 62. By operation of the piston and the air cylinder 59, a pull can be imparted through the cable 55c to the chains 54 to elevate the digging wheel 13 and also cause it to swing bodily to its horizontal position as above described. This movement can also be effected manually through the crank handles 61 in event of failure of the air cylinder, or the crank handles 61 may be operated to take up any slack and provide a safety feature.

The digging wheel 13 is driven by an electric motor 62 deriving its current from the power unit 25 and operating through reduction gears, universal joints 52' and telescoping shafts 53' to the gears 32 above described. The telescoping shaft connection enables the digging wheel to be swung to the position shown on Figure 9.

In order to prevent the stone from being thrown laterally in the operation of the digging wheel 13, wing plates 63 are disposed on opposite sides of the wheel with a portion of each extending slightly in advance so that any stone that is thrown up will be held substantially within the lateral confines of the digging wheel. The wing plates 63 are suitably carried by the plates 28 substantially as indicated in Figure 5.

It will be apparent that in the operation of the digging wheel 13, the prongs or teeth of the buckets 15 dig into the ballast B and elevate the same, the individual buckets discharge their load upon a conveyor 64 supported by brackets 65 mounted on the I-beams 29 and suitably driven by an electric motor 66. The ballast is delivered by the conveyor 64 to the vertically inclined conveyor 16, the latter being driven by an independent electric motor 67. As above explained, the ballast from the conveyor 16 falls upon a vibrating screen 17 of any suitable or well-known construction which is disposed beneath and substantially in parallel relationship to the conveyor 16 so that the stone progressively travels from the upper end to the lower end of the screen. Any suitable means may be provided for imparting vibratory action to the screen 17 and since the details of the screen form no part of the present invention, further description is not considered necessary.

In order to prevent the ballast on the screen 17 from crowding to one side or the other, which would be the case if the screen were tilted laterally, a support is provided therefor which maintains the screen substantially horizontal or in its normal position irrespective of any tilting of the railway car as, for example, on curves where one side of the track is considerably raised. For this purpose, as shown on Figures 10 and 11, the forward end is supported by a substantially inverted V-shaped plate 68, the apex of which is pivoted at 69 to a supporting beam 70. Depending from opposite ends of the plate 68 are rods 71 which are pivotally connected to the plate at one end and are pivoted at their lower ends to the forward end portion of the screen 17. Likewise, the rear end of the screen 17 is supported by a similar plate 68a from which rods 71a depend and are pivotally connected to the plate and screen, the plate 68a being pivoted at 69a to a supporting beam 70a. By virtue of the above described hanger support, it will be apparent that the screen will always remain in its predetermined normal position even though the railway car may tilt in one direction or the other.

From the above description, it will be apparent that the cleaned stone or ballast is delivered upon the lateral conveyor 23 from the screen 17 and the conveyor 23 is driven by an electric motor 72 deriving its current from the power unit 25.

As shown in Figure 13, the lateral conveyor 23 discharges the cleaned ballast into the box 24 which is formed with vertically disposed side panels 73 and 74, a transverse partition 75 and an upwardly and rearwardly inclined front wall 76 and a rear wall 77. As indicated in Figure 1, a portion of the box or shoe between the partition 75 and the rear wall 77 extends upwardly relative to the front end portion of the box and the side wall 74 is somewhat shorter than the opposite wall 73 and the rear wall 77 has an inclined edge portion to facilitate the introduction of stone into the box. It will be observed that the box has no bottom wall, the sides riding along the cut made by the digging wheel 13.

The box or shoe 24 is carried by a bracket arm 79 fixed at one end to the digging wheel plates 28 and formed with apertured bosses to receive posts 81 which are secured to and extend upwardly from the box or profile former 24. The posts 81 are free to move vertically in the bosses 80 so that as the shoe 24 advances, it can float vertically. It should be noted that the inclined front wall 76 of the shoe is disposed directly in rear of the digging wheel 13 so that no opportunity is presented for the ballast on the side of the excavation to fall inwardly.

The rear wall 77 of the shoe which is preferably adjustable vertically, as shown in Fig. 14a has an upwardly inclined lower edge 82 as shown on Figure 13 which governs the shape of the ballast bed and determines its profile. As depicted in said Fig. 14a, in order to provide for this vertical adjustment of the rear wall 77, the latter may be provided with flanges 77a that are secured to the sides of the shoe by bolt and slot connections 77b. Obviously, the profile may be changed as desired by changing the contour of the lower edge of the wall 77 so that the angle of the ballast bed may be varied as well as its shape and contour.

The spoil or dirt which passes through the vibrating screen 17 drops upon the conveyor 18 which is driven by an electric motor 83 deriving its current from the power unit 25. The spoil is discharged from the upper end of the conveyor 18 into the chute 19, the upper section 84 of which is substantially funnel-shaped and is hingedly connected at 85 to the lower chute section 86. The conveyor 22 may be extended rearwardly to the position indicated in Figure 2 in order to deposit the dirt or spoil into the larry 21, and when the conveyor is so extended, the section 84 of the chute 19 swings to the position indicated in Figure 2, such movement of the chute section 84 being accomplished in any suitable manner.

The conveyor 22 is driven by an electric motor 87 to which current is supplied from the power unit 25 but may be manually moved to and from its extended position. For this purpose, a sheave 88 has a crank handle 89 and a cable 90 has one end connected to the rearward end of the conveyor 22 and extends forwardly to the sheave 88. From the sheave 88, the cable 90 passes around a guide sheave 91 and has its opposite end secured to a bar 92 extending forwardly from the conveyor. The bar 92 is pivoted to a slide 93 which straddles the endless belt of the conveyor 18 and is mounted for sliding movements on a channel beam 94. It will be manifest that by turning the crank handle 89 in one direction to rotate the sheave 88, about which a portion of the cable 90 is wound, in one direction the conveyor 22 may be extended to the position indicated in Figure 2, the forward portion thereof sliding along the beam 94 and being supported thereby. Upon rotation of the crank handle 89 in the opposite direction, the conveyor 22 is moved forwardly to its normal position beneath the conveyor 18. It will be apparent that in either position of adjustment, the rearward end of the conveyor 22 is supported by a portion of the cable 90 and this arrangement provides an exceedingly simple and compact construction materially reducing the over-all length of the railway car.

When the conveyor 22 is in its normal position as shown on Figure 1, with the chute section 84 in its upright position, the spoil drops through the chute and the stream may be divided by the furcations 86a and 86b. The stream may pass into both furcations or may be directed into one or the other by a manually operated gate valve 95. At the lower ends of the furcations 86a and 86b, are lateral conveyors 20 respectively, driven by individual electric motors 97 operated from the power unit 25 and having their outer ends supported by cables 98. Each of the conveyors 96 is suitably mounted on the car frame or bed 33 for swinging movements about a vertical axis so that when not in use, they may be swung inwardly upon the railway car, one of which being shown in that position on Figure 3. Thus, the spoil may be distributed to both sides of the car or to one side of the car.

It should be understood that the above described conveyor system is designed to receive sufficient stone to fill the cut formed by the digging wheel after the wheel has been shifted away from digging position. The conveyors also do not commence delivering stone to the cut until the shoe has dug itself into the cut, so that the cleaned ballast is thus most efficiently handled and waste or improper spreading is obviated.

From the above description it will be apparent that we have shown and described a machine which accomplishes the objects primarily enumerated, but it is to be understood that the above description is to be considered as illustrative and not as limiting because numerous changes in details of construction, arrangement and operation may be effected without departing from the spirit of the invention especially as defined in the appended claims.

What we claim is:

1. In a ballast cleaning machine, a digger for removing ballast from the road bed, a distributing box for discharging the cleaned stone at the rear of said digger, means connecting said box to said machine for movement therewith and with respect thereto in response to the contour of the road bed, said box having a rear wall provided with an inclined lower edge and cooperating with said connecting means for controlling the profile of the discharged stone bed, and said box having an inclined front face to prevent ingress of ballast from the sides of the cut made by said digger.

2. In a ballast cleaning machine, a supporting frame carrying a digging wheel for removing ballast from the road bed, a distributing box for discharging the cleaned stone at the rear of the digging wheel, and connecting means between said box and said frame for imparting movement of said digger to said box, said connecting means comprising a bracket fixed to said frame and a post carried by said box and slidable in said bracket to permit relative movement between said box and the digging wheel, said box having an adjustable rear wall for producing a discharged stone bed of predetermined height and profile.

3. In a ballast cleaning machine, a digger for removing ballast from the road bed, a distributing box for discharging the cleaned stone at the rear of said digger, means connecting said box to said digger for movement therewith and with respect thereto in response to the contour of the road bed, said box having a rear wall provided with an inclined lower edge and cooperating with said connecting means for controlling the profile of the discharged stone bed, and said box having an inclined front face to prevent ingress of ballast from the sides of the cut made by said digger, and said rear wall being adjustable to vary the height of the bed.

4. Ballast cleaning machine comprising a railway car, a centerless digging wheel at one side of the car, a supporting frame for said wheel positioned substantially within the lateral dimensions thereof, said frame including laterally spaced plate members, a diametrically disposed beam for each plate member secured thereto, a lateral post connected to said beams, a bracket supporting said post, means for adjusting said wheel laterally toward and away from said bracket, an upright on said car along which said bracket is movable, a frame secured to said upright and pivotally mounted on said car to swing about a horizontal axis, and means for actuating said bracket and bodily swinging said frame, upright, bracket and associate parts.

5. A ballast cleaning machine including a railway car, a digging wheel at one side of the car, means carried by the car and connected to the digging wheel to support the latter from the car, in one position of the wheel and in a second position of the wheel to dispose same in overlying relation to the car, means to effect bodily adjustment of the digging wheel in a horizontal plane toward and from the car, means carried by the car for actuating the digging wheel, and a power shaft connected to the actuating means and connected to the wheel to operate the latter, said power shaft being adjustable whereby to provide for movement of the wheel in a horizontal plane toward and away from the car and for movement of the wheel in any adjusted position of the latter to overlie the car.

6. A ballast cleaning machine in accordance with claim 5, wherein the means for actuating the digging means consists of a motor, and wherein the power shaft is composed of telescopic elements that are extensible and contractile upon outward and inward adjustment of the wheel, and wherein one of the elements has one end connected to the motor and wherein another of the elements has means thereon engaging the wheel to operate the latter.

WILLIAM G. VAN VOORHIS.
CHARLES A. CRABIEL.